United States Patent
Shinoda et al.

(10) Patent No.: US 11,309,603 B2
(45) Date of Patent: Apr. 19, 2022

(54) SQUARE SECONDARY BATTERY, BATTERY MODULE, STORAGE DEVICE, VEHICLE, AND FLYING OBJECT

(71) Applicant: KABUSHIKI KAISHA TOSHIBA, Minato-ku (JP)

(72) Inventors: Tatsuya Shinoda, Kashiwazaki (JP); Nobuyasu Negishi, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 122 days.

(21) Appl. No.: 16/807,225

(22) Filed: Mar. 3, 2020

(65) Prior Publication Data

US 2020/0203678 A1 Jun. 25, 2020

Related U.S. Application Data

(63) Continuation of application No. PCT/JP2018/035067, filed on Sep. 21, 2018.

(30) Foreign Application Priority Data

Sep. 26, 2017 (JP) .............................. JP2017-185145

(51) Int. Cl.
  *H01M 50/148* (2021.01)
  *H01M 50/147* (2021.01)
  *H01M 50/543* (2021.01)

(52) U.S. Cl.
  CPC ....... *H01M 50/148* (2021.01); *H01M 50/147* (2021.01); *H01M 50/543* (2021.01); *H01M 2220/20* (2013.01)

(58) Field of Classification Search
  None
  See application file for complete search history.

(56) References Cited

U.S. PATENT DOCUMENTS

| 6,007,936 A | 12/1999 | Iwase et al. |
| 2012/0135285 A1 | 5/2012 | Iwama et al. |

(Continued)

FOREIGN PATENT DOCUMENTS

| EP | 1 091 432 A2 | 4/2001 |
| EP | 1 139 483 A1 | 10/2001 |

(Continued)

OTHER PUBLICATIONS

English translation of the International Preliminary Report on Patentability dated Mar. 31, 2020 in PCT/JP2018/035067, 5 pages.

(Continued)

*Primary Examiner* — Wyatt P McConnell
(74) *Attorney, Agent, or Firm* — Oblon, McClelland, Maier & Neustadt, L.L.P.

(57) ABSTRACT

A square secondary battery of an embodiment includes an outer can formed in a shape of a bottomed cylinder having a cross-sectional shape of a substantially quadrangular shape, the outer can having an opening, a power generation element contained in the outer can, and a lid having a positive electrode terminal and a negative electrode terminal, the lid covering the opening of the outer can. Two or more convex portions exist on each of one or more surfaces of a side surface of an outer surface of the outer can, a bottom surface of the outer surface of the outer can, and a surface having the positive electrode terminal and the negative electrode terminal of an outer surface of the lid.

9 Claims, 9 Drawing Sheets

(56) References Cited

U.S. PATENT DOCUMENTS

2014/0370353 A1* 12/2014 Oshiba ................. H01M 50/20
429/120
2015/0086847 A1 3/2015 Minagata

FOREIGN PATENT DOCUMENTS

| | | |
|---|---:|---|
| EP | 2 816 633 A1 | 12/2014 |
| JP | 09-219180 A | 8/1997 |
| JP | 10-255861 A | 9/1998 |
| JP | 2002-329483 A | 11/2002 |
| JP | 2003-181669 A | 7/2003 |
| JP | 5392368 B2 | 1/2014 |
| JP | 5527176 B2 | 6/2014 |
| JP | 2015-018790 A | 1/2015 |
| JP | 5677130 B2 | 2/2015 |
| JP | 5684617 B2 | 3/2015 |
| JP | 2015-228288 A | 12/2015 |
| JP | 5966916 B2 | 8/2016 |
| WO | WO 2013/146735 A1 | 10/2013 |

OTHER PUBLICATIONS

Office Action dated Aug. 10, 2021 in corresponding Japanese Patent Application No. 2017-185145 (with English Translation), 5 pages.
International Search Report dated Nov. 13, 2018 in PCT/JP2018/035067 filed on Sep. 21, 2018, 1 page.
Extended European Search Report dated May 6, 2021 in corresponding European Patent Application No. 18862934.9, 9 pages.

* cited by examiner

SQUARE SECONDARY BATTERY, BATTERY MODULE, STORAGE DEVICE, VEHICLE, AND FLYING OBJECT

CROSS-REFERENCE TO RELATED APPLICATION

This application is a continuation application based upon and claims the benefit of priority from Japanese Patent Application No. 2017-185145, filed on Sep. 26, 2017; and International Application PCT/JP2018/035067, the International Filing Date of which is Sep. 21, 2018 the entire contents of which are incorporated herein by reference.

FIELD

Embodiments described herein relate generally to a square secondary battery, a battery module, a storage device, a vehicle, and a flying object.

BACKGROUND

With the advance of electronic devices such as mobile phones and personal computers, secondary batteries used in these devices have been required to be smaller and lighter. As secondary batteries having a high energy density to meet the demand, lithium-ion secondary batteries are available. On the other hand, secondary batteries such as lead storage batteries and nickel-hydrogen batteries have been used as large-sized and large-capacity power supplies represented by electric vehicles, hybrid vehicles, electric motorcycles, forklifts, and the like. However, recently, development for adoption of the lithium-ion secondary batteries having a high energy density has been actively conducted. In response to the development of the lithium-ion secondary batteries, development of a large size and a large capacity has been conducted in consideration of long life, safety, and the like.

As a power supply for these applications, a battery pack containing a large number of batteries connected in series or in parallel due to large driving power is used. For this reason, from the viewpoint of a mounting density, a square battery of a rectangular parallelepiped shape using a metal can in which a weight and a thickness are reduced has been actively examined.

However, in the square battery using the metal can whose thickness has been reduced, variations in the internal pressure of the battery during a manufacturing process or use occur and cause changes in the outer shape such as depression and bulging, thereby degrading outer shape precision of the square battery. For this reason, when battery packs and modules are designed, a design allowing a large dimensional tolerance has been required.

DETAILED DESCRIPTION

Figure 1:
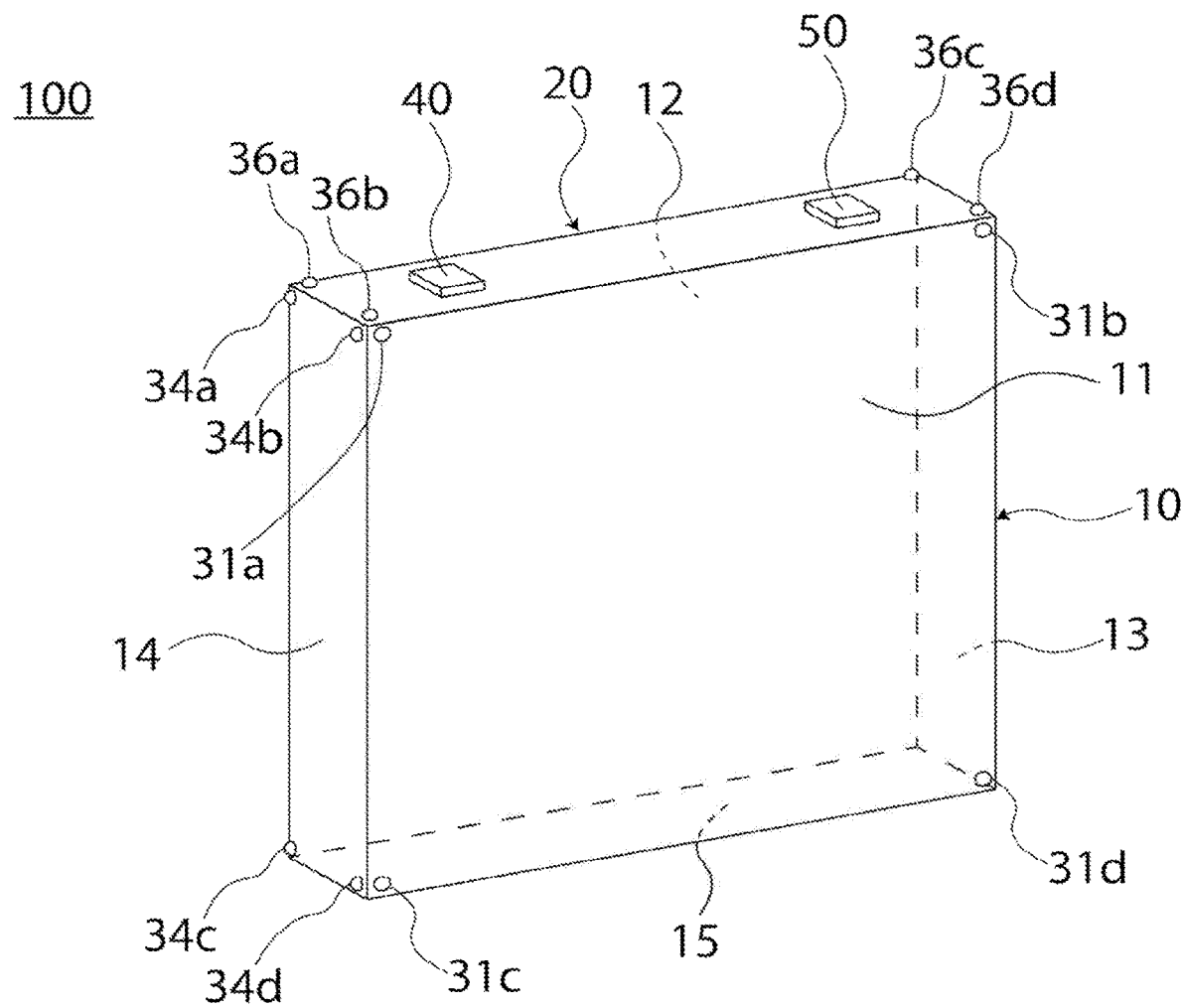
FIG. 1 is a perspective view of a secondary battery according to an embodiment.

A square secondary battery of an embodiment includes an outer can formed in a shape of a bottomed cylinder having a cross-sectional shape of a substantially quadrangular shape, the outer can having an opening, a power generation element contained in the outer can, and a lid having a positive electrode terminal and a negative electrode terminal, the lid covering the opening of the outer can. Two or more convex portions exist on each of one or more surfaces of a side surface of an outer surface of the outer can, a bottom surface of the outer surface of the outer can, and a surface having the positive electrode terminal and the negative electrode terminal of an outer surface of the lid.

Hereinafter, embodiments will be described with reference to the drawings. In the following description, components performing the same or similar functions will be denoted by the same reference numerals throughout all the drawings, without redundant description. Each drawing is a conceptual diagram for promoting the explanation and understanding of the embodiments, and its shape, dimension, ratio, and the like may be different from those of an actual device. However, these can be appropriately designed and changed in consideration of the following description and known technologies.

First Embodiment

A first embodiment relates to a square secondary battery. A perspective view of FIG. 1 shows the secondary battery according to the first embodiment. A secondary battery 100 shown in FIG. 1 includes an outer can 10, a power generation element accommodated in the outer can 10, and a lid 20, and convex portions (31, 34, and 36) exist in the outer can 10 and the lid 20. The lid 20 has a positive electrode terminal 40 and a negative electrode terminal 50. The outer can 10 has four side surfaces including a side surface 11, a side surface 12, a side surface 13, and a side surface 14, and a bottom surface 15. At an angle in the perspective view of FIG. 1, the side surface 12, the side surface 13, and the bottom surface 15 are located at positions where blind spots are formed. In the embodiment, an outer shape of the secondary battery 100 can be evaluated from distances between convex portions existing on different surfaces, distances between two or more convex portions existing on one surface, a distance between one convex portion and the positive electrode terminal 40, and a distance between one convex portion and the negative electrode terminal 50.

In each of one or more surfaces of the side surfaces 11, 12, 13, and 14 of the outer can 10 of the secondary battery 100 according to the first embodiment, the bottom surface 15 of the outer surface of the outer can 10, and a surface having the positive electrode terminal 40 and the negative electrode terminal 50 of the outer surface of the lid 20, two or more convex portions exist. In FIG. 1, convex portions exist on a plurality of outer surfaces. However, two or more convex portions may exist in at least one of the side surface 11 of the outer surface, the side surface 12 of the outer surface, the side surface 13 of the outer surface, the side surface 14 of the outer surface, the bottom surface 15 of the outer surface, and the lid 20 of the outer surface. The convex portions are preferably provided in the side surfaces 11, 12, 13, and 14 and the bottom surface 15 of the outer can 10 where deformation easily occurs. Further, by providing convex portions in the lid 20, precision of the outer shape evaluation can be improved, and the error evaluation of the battery shape can be easily performed. Further, the secondary battery 100 whose outer shape has been evaluated is useful even in module design, because it is easy to evaluate a shape error when the secondary battery 100 is incorporated in a module or the like. FIG. 1 is a perspective view from a direction in which the side surface 11, the side surface 14, and the bottom surface 15 of the outer surface of the outer can 10 and the outer surface of the lid 20 can be confirmed, and convex portions exist on each surface. The two or more convex portions exist on one surface, so that the shape of the secondary battery can be measured from distances between the convex portions on the surface.

The outer can 10 according to the embodiment is formed in a shape of a bottomed cylinder in which a cross-sectional shape is a substantially quadrangular shape, and has an opening. A thickness of the outer can 10 is typically 0.2 μm or more and 1.5 mm or less. The outer can 10 and the lid 10 are preferably made of metal using aluminum, aluminum alloy, iron, stainless steel, or the like. The cross-sectional shape of the outer can 10 is a substantially quadrangular shape. A height of the outer can 10 is typically 30 mm or more and 180 mm or less. A width of the outer can 10 is typically 60 mm or more and 180 mm or less. A depth of the outer can 10 is typically 4 mm or more and 45 mm or less. The cross-sectional shapes of the side surfaces 11, 12, 13, and 14 and the bottom surface 15 of the outer can 10 may be semi-elliptical shapes. By providing the convex portions even in the semi-elliptical shapes, the outer shape of the square secondary battery 100 can be easily evaluated.

Figure 2:
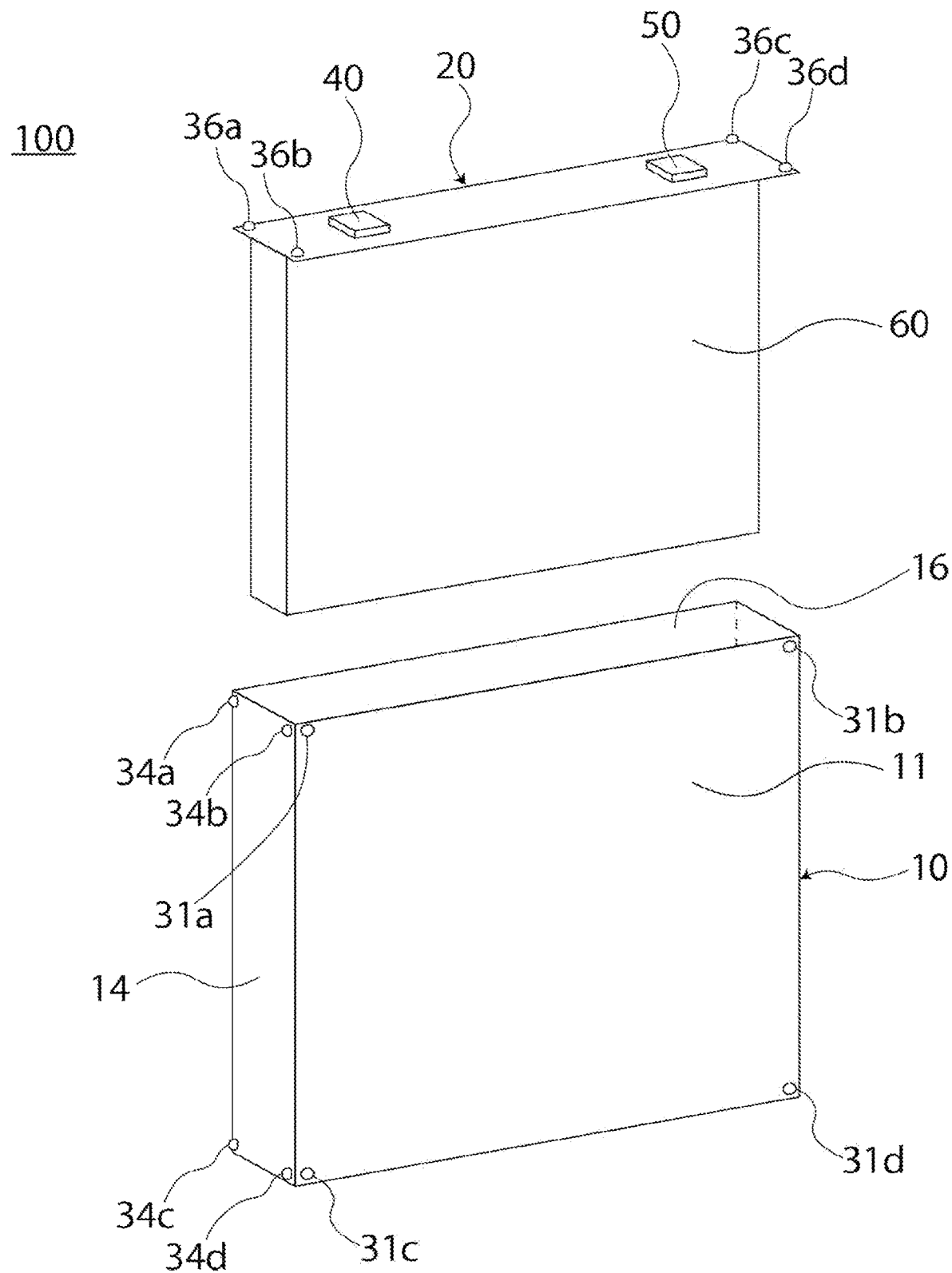
FIG. 2 is a developed perspective view of a secondary battery according to an embodiment.

FIG. 2 is a developed perspective view of the secondary battery 100 according to the first embodiment. A power generation element 60 connected to the positive electrode terminal 40 and the negative electrode terminal 50 of the lid 20 is shown. The positive electrode terminal 40 and the negative electrode terminal 50 of the lid 20 are electrically insulated from the lid 20. The power generation element 60 has a positive electrode, a separator, and a negative electrode. The positive electrode of the power generation element 60 is electrically connected to the positive electrode terminal 40. The negative electrode of the power generation element 60 is electrically connected to the negative electrode terminal 50. An electrolyte (not shown) is accommodated in the outer can 10 together with the power generation element 60. The power generation element 60 includes, for example, a wound electrode group. The electrolyte is a non-aqueous electrolyte or an aqueous electrolyte. The lid 20 may further have a gas valve, an electrolyte inlet, and the like (not shown).

In the developed perspective view of FIG. 2, an opening 16 is shown. In the secondary battery 100, the opening 16 is covered with the lid 20 and is joined to the lid 20. At the opening 16 of the outer can 10, the outer can 10 is airtightly sealed with the lid 20. The outer can 10 and the lid 20 are preferably joined by, for example, laser welding. A shape of the lid 20 depends on a shape of the opening 16. However, the shape of the lid 20 is typically a substantially quadrangular shape. A thickness of the lid 20 is typically 0.2 μm or more and 2.0 μm or less.

Figure 3:
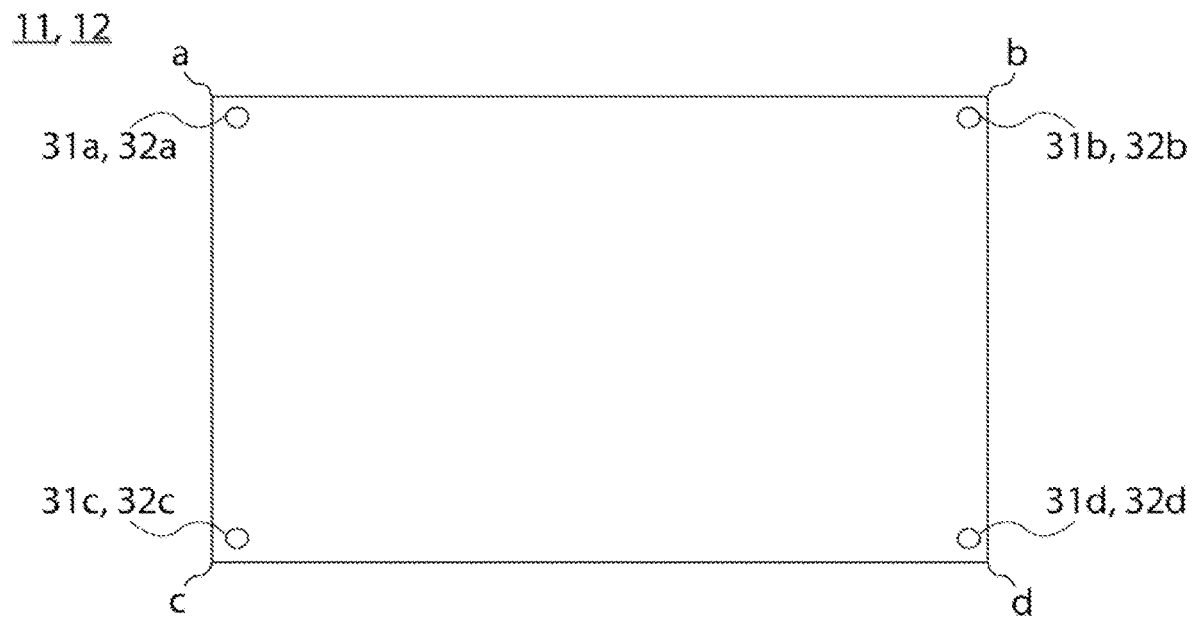
FIG. 3 is a conceptual diagram of a side surface of an outer can according to an embodiment.

The convex portions on the side surface 11 of the outer can 10 will be described. A conceptual diagram of FIG. 3 shows the side surfaces 11 and 12 of the outer surface of the outer can 10 where hemispherical or conical convex portions 31 and 32 exist. The convex portions 31 exist on the side surface 11. The convex portions 32 exist on the side surface 12. In the conceptual diagram of FIG. 3, four corners a, b, c, and d of the side surfaces 11 and 12 are shown. In the conceptual diagram of FIG. 3, convex portions 31a, 31b, 31c, and 31d (32a, 32b, 32c, and 32d) exist one by one in the vicinity of all the four corners a, b, c, and d. If the two convex portions 31 and 32 exist on the surface having the convex portions, the outer shape can be evaluated. In addition, the thickness of the outer can 10 can be evaluated from the distances between one or more convex portions 31 and one or more convex portions 32. Further, the distances between one or more convex portions 31 and 32 and the positive electrode terminal 40 or the distances between one or more convex portions 31 and 32 and the negative electrode terminal 50 can be evaluated. If there are the three convex portions 31 and 32, three distances between the convex portions 31 and 32 are obtained. Therefore, this is preferable in that the outer shape evaluation of the side surfaces 11 and 12 can be performed in more detail than that in the case of using only the distances from the two convex portions. If there are the four convex portions 31 and 32, six distances between the convex portions are obtained. Therefore, this is preferable in that the outer shape evaluation of the side surfaces 11 and 12 can be performed in more detail than that in the case of using the distances from the three convex portions. In the side surfaces 11 and 12, the long sides of the bottom surface 15 of the outer can 10 are included as the sides of the side surfaces 11 and 12.

In performing the outer shape evaluation, the larger distance between the convex portions is preferable because more detailed outer shape evaluation can be performed. The convex portions 31 and 32 preferably exist in the vicinity of at least one of the four corners a, b, c, and d. Specifically, the convex portions 31 and 32 exist preferably within a range of 10 mm or less from the corners (the distances between the corners and the convex portions). The convex portions 31 and 32 exist more preferably within a range of 0.5 mm or more and 5 mm or less, still more preferably, within a range of 0.5 mm or more and 3 mm or less from the corners. The distances between the corners a, b, c, and d and the convex portions 31 and 32 are the distances from the corners to the vertexes of the nearest convex portions 31 and 32 in the vicinity of the corners. Further, the convex portions 31 and 32 exist preferably at the center portions of the side surfaces 11 and 12, because it is easy to detect bulging of the center portions of the side surfaces 11 and 12.

In order to evaluate the outer shape, the convex portions 31 and 32 preferably exist in the vicinity of all the four corners a, b, c, and d. Therefore, as shown in the conceptual diagram of FIG. 3, it is preferable that the convex portions 31 and 32 exist within a range of 10 mm or less from the four corners a, b, c, and d, and one convex portion exists at each of the corners a, b, c, and d. Further, it is more preferable that the convex portions 31 and 32 exist within a range of 0.5 mm or more and 10 mm or less from the four corners a, b, c, and d, and one convex portion exists at each of the corners a, b, c, and d. It is preferable that the convex portions 31 and 32 exist within a range of 0.5 mm or more and 3 mm or less from the four corners a, b, c, and d, and one convex portion exists at each of the corners a, b, c, and d. Further, a difference between a maximum value and a minimum value of the distances between the convex portions 31 and 32 and the corners is preferably within 20% of an average value of the distances between the convex portions 31 and 32 and the corners, because there is little variation in the positions of the convex portions 31 and 32.

When the side surfaces 11 and 12 do not have a quadrangular shape but have a substantially quadrangular shape such as a rounded quadrangular shape, the corners a, b, c, and d of the side surfaces 11 and 12 are determined by the following method. Approximation straight lines of the four sides of the side surfaces 11 and 12 are obtained, and then four vertexes of a quadrangle formed from the four approximation straight lines are determined. Then, diagonal lines of the four vertexes are drawn, and intersections of the diagonal lines and the outlines of the side surfaces 11 and 12 are defined as the corners a, b, c, and d. By the above method, the four corners are determined even if the side surfaces 11 and 12 do not have a quadrangular shape, and distances from the corners to the convex portions 31*a*, 31*b*, 31*c*, and 31*d* (32*a*, 32*b*, 32*c*, and 32*d*) are obtained.

Figure 4:
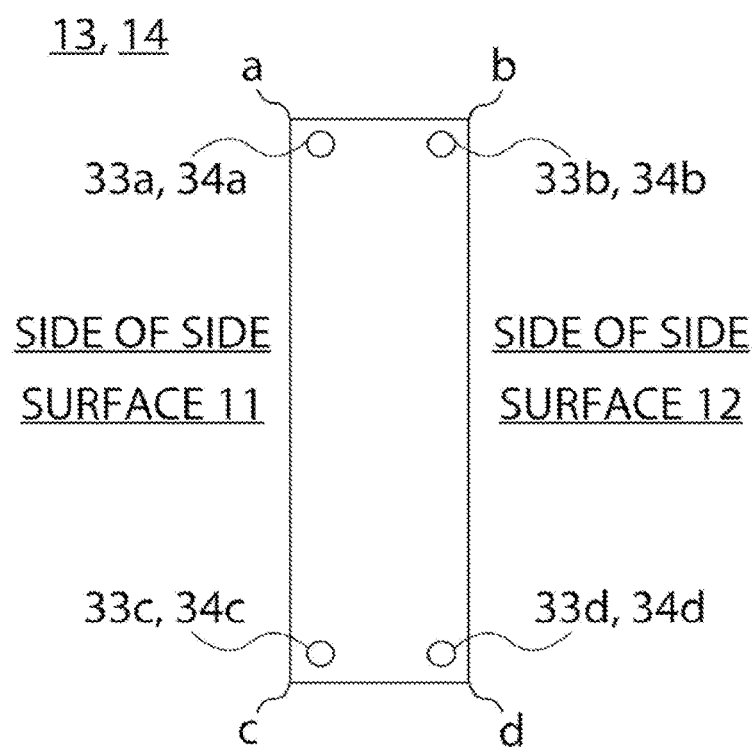
FIG. 4 is a conceptual diagram of a side surface of an outer can according to an embodiment.

Next, the convex portions on the side surfaces 13 and 14 of the outer can 10 will be described. A conceptual diagram of FIG. 4 shows the side surfaces 13 and 14 of the outer surface of the outer can 10 where hemispherical or conical convex portions 33 and 34 exist. The convex portions 33 exist on the side surface 13. The convex portions 34 exist on the side surface 14. In the conceptual diagram of FIG. 4, the four corners a, b, c, and d of the side surfaces 13 and 14 are shown. In the conceptual diagram of FIG. 4, convex portions 33*a*, 33*b*, 33*c*, and 33*d* (34*a*, 34*b*, 34*c*, and 34*d*) exist one by one in the vicinity of all the four corners a, b, c, and d. If the two convex portions 33 and 34 exist on the surface having the convex portions, the outer shape can be evaluated. In addition, the width of the outer can 10 can be evaluated from the distances between one or more convex portions 33 and one or more convex portions 34. Further, the distances between one or more convex portions 33 and 34 and the positive electrode terminal 40 or the distances between one or more convex portions 33 and 34 and the negative electrode terminal 50 can be evaluated. If there are the three convex portions 33 and 34, the three distances between the convex portions 33 and 34 are obtained. Therefore, this is preferable in that the outer shape evaluation of the side surfaces 13 and 14 can be performed in more detail than that in the case of using only the distances from the two convex portions. If there are the four convex portions 33 and 34, the six distances between the convex portions are obtained. Therefore, this is preferable in that the outer shape evaluation of the side surfaces 13 and 14 can be performed in more detail than that in the case of using the distances from the three convex portions. In the side surfaces 13 and 14, the short sides of the bottom surface 15 of the outer can 10 are included as the sides of the side surfaces 13 and 14. Since the side surfaces 13 and 14 have a smaller area than the side surfaces 11 and 12, the distance between the convex portions is small. Therefore, if the convex portions are provided on one or two of the side surfaces, it is preferable to provide the convex portions on the side surfaces 11 and 12 rather than the side surfaces 13 and 14.

In performing the outer shape evaluation, the larger distance between the convex portions is preferable because more detailed outer shape evaluation can be performed. The convex portions 33 and 34 preferably exist in the vicinity of at least one of the four corners a, b, c, and d. Specifically, the convex portions 33 and 34 exist preferably within a range of 10 mm or less from the corners (the distances between the corners and the convex portions). The convex portions 33 and 34 exist more preferably within a range of 0.5 mm or more and 5 mm or less, still more preferably, within a range of 0.5 mm or more and 3 mm or less from the corners. The distances between the corners a, b, c, and d and the convex portions 33 and 34 are the distances from the corners to the vertexes of the nearest convex portions 33 and 34 in the vicinity of the corners. Further, the convex portions 33 and 34 exist preferably at the center portions of the side surfaces 13 and 14, because it is easy to detect bulging of the center portions of the side surfaces 13 and 14.

In order to evaluate the outer shape, the convex portions 33 and 34 preferably exist in the vicinity of all the four corners a, b, c, and d. Therefore, as shown in the conceptual diagram of FIG. 4, it is preferable that the convex portions 33 and 34 exist within a range of 10 mm or less from the four corners a, b, c, and d, and one convex portion exists at each of the corners a, b, c, and d. Further, it is more preferable that the convex portions 33 and 34 exist within a range of 0.5 mm or more and 10 mm or less from the four corners a, b, c, and d, and one convex portion exists at each of the corners a, b, c, and d. It is preferable that the convex portions 33 and 34 exist within a range of 0.5 mm or more and 3 mm or less from the four corners a, b, c, and d, and one convex portion exists at each of the corners a, b, c, and d. Further, a difference between a maximum value and a minimum value of the distances between the convex portions 33 and 34 and the corners is preferably within 20% of an average value of the distances between the convex portions 33 and 34 and the corners, because there is little variation in the positions of the convex portions 33 and 34.

When the side surfaces 13 and 14 do not have a quadrangular shape but have a substantially quadrangular shape such as a rounded quadrangular shape, the corners a, b, c, and d of the side surfaces 13 and 14 are determined by the following method. Approximation straight lines of the four sides of the side surfaces 13 and 14 are obtained, and then four vertexes of a quadrangle formed from the four approximation straight lines are determined. Then, diagonal lines of the four vertexes are drawn, and intersections of the diagonal lines and the outlines of the side surfaces 13 and 14 are defined as the corners a, b, c, and d. By the above method, the four corners are determined even if the side surfaces 13 and 14 do not have a quadrangular shape, and the distances from the corners to the convex portions 33*a*, 33*b*, 33*c*, and 33*d* (34*a*, 34*b*, 34*c*, and 34*d*) are obtained.

Figure 5:
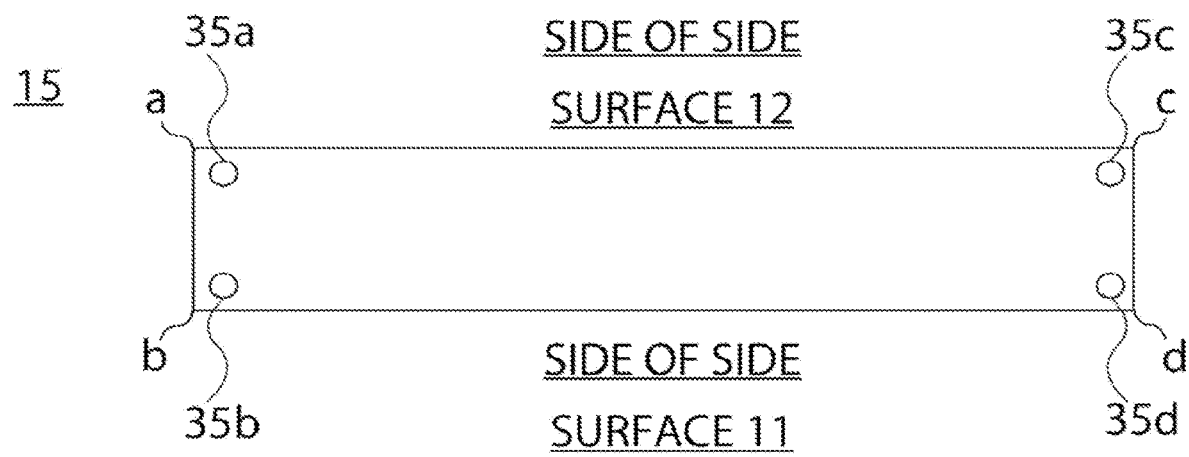
FIG. 5 is a conceptual diagram of a bottom surface of an outer can according to an embodiment.

Next, the convex portions on the bottom surface 15 of the outer can 10 will be described. A conceptual diagram of FIG. 5 shows the bottom surface 15 of the outer surface of the outer can 10 where hemispherical or conical convex portions 35 exist. The convex portions 35 exist on the bottom surface 15. In the conceptual diagram of FIG. 5, the four corners a, b, c, and d of the bottom surface 15 are shown. For example, the distances between the convex portions 35 on the bottom surface and the positive electrode terminal 40 or the negative electrode terminal 50 of the lid 16 can be evaluated. In addition, it is possible to evaluate at least one of the distance from the positive electrode terminal 40 to the bottom surface 15, the distance from the negative electrode terminal 50 to the bottom surface 15, the height of the secondary battery 100, and the height of the outer can 10. In the conceptual diagram of FIG. 5, the convex portions 35*a*, 35*b*, 35*c*, and 35*d* exist one by one in the vicinity of all the four corners a, b, c, and d. If the two convex portions 35 exist on the bottom surface 15, the outer shape of the bottom surface 15 can be evaluated from the distance between the two convex portions 35. If there are the three convex portions 35, three distances between the convex portions 35 are obtained. Therefore, this is preferable in that the outer shape evaluation of the bottom surface 15 can be performed in more detail than that in the case of using only the distances from the two convex portions. If there are the four convex portions 35, six distances between the convex portions are obtained. Therefore, this is preferable in that the outer shape evaluation of the bottom surface 15 can be performed in more detail than that in the case of using the distances from the three convex portions.

In performing the outer shape evaluation, the larger distance between the convex portions is preferable because more detailed outer shape evaluation can be performed. The convex portion 35 preferably exists in the vicinity of at least one of the four corners a, b, c, and d of the bottom surface 15. Specifically, the convex portion 35 exists preferably within a range of 10 mm or less from the corner of the bottom surface 15 (the distance between the corner and the convex portion). The convex portion 35 exists more preferably within a range of 0.5 mm or more and 5 mm or less, still more preferably, within a range of 0.5 mm or more and 3 mm or less from the corner of the bottom surface 15. The distances between the corners a, b, c, and d and the convex portions 35 are the distances from the corners to the vertex of the nearest convex portion 35 in the vicinity of the corners.

In order to evaluate the outer shape, the convex portions 35 preferably exist in the vicinity of all the four corners a, b, c, and d. Therefore, as shown in the conceptual diagram of FIG. 5, it is preferable that the convex portions 35 exist within a range of 10 mm or less from the four corners a, b, c, and d, and one convex portion exists at each of the corners a, b, c, and d. Further, it is more preferable that the convex portions 35 exist within a range of 0.5 mm or more and 10 mm or less from the four corners a, b, c, and d, and one convex portion exists at each of the corners a, b, c, and d. It is preferable that the convex portions 35 exist within a range of 0.5 mm or more and 3 mm or less from the four corners a, b, c, and d, and one convex portion exists at each of the corners a, b, c, and d. Further, a difference between a maximum value and a minimum value of the distances between the convex portions 35 and the corners is preferably within 20% of an average value of the distances between the convex portions 35 and the corners, because there is little variation in the positions of the convex portions 35.

Figure 6:
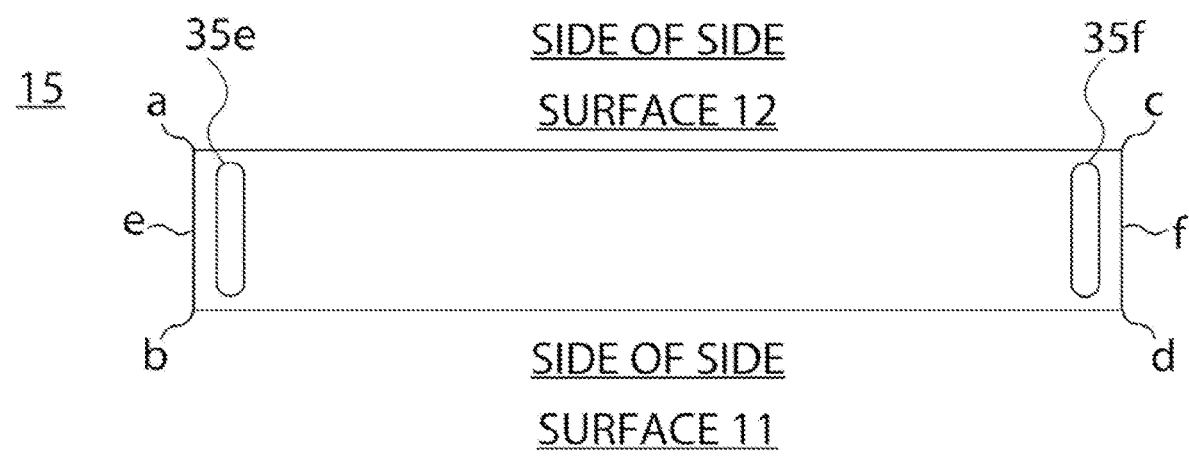
FIG. 6 is a conceptual diagram of a bottom surface of an outer can according to an embodiment.

Further, as shown in the conceptual diagram of FIG. 6, a mode in which linear convex portions 35*e* and 35*f* exist on the bottom surface 15 of the outer surface of the outer can 10 is also preferable. For example, the distances between the convex portions 35 on the bottom surface and the positive electrode terminal 40 or the negative electrode terminal 50 of the lid 16 can be evaluated. In addition, it is possible to evaluate at least one of the distance from the positive electrode terminal 40 to the bottom surface 15, the distance from the negative electrode terminal 50 to the bottom surface 15, the height of the secondary battery 100, and the height of the outer can 10. Since there are the two linear convex portions 35*e* and 35*f*, the outer shape of the bottom surface 15 of the secondary battery 100 can be evaluated from a distance between the linear convex portions 35*e* and 35*f*. An aspect ratio (length/width) of the linear convex portions 35*e* and 35*f* is preferably 3 or more and 10 or less.

In the linear convex portions 35*e* and 35*f*, each distance from the two short sides e and f of the bottom surface 15 is preferably 10 mm or less. In the linear convex portions 35*e* and 35*f*, each distance from the two short sides e and f of the bottom surface 15 is more preferably 0.5 mm or more and 5 mm or less, still more preferably, 0.5 mm or more and 3 mm or less When the bottom surface 15 does not have a quadrangular shape but has a substantially quadrangular shape such as a rounded quadrangular shape, the corners a, b, c, and d of the bottom surface 15 are determined by the following method. Approximation straight lines of the four sides of the bottom surface 15 are obtained, and then four vertexes of a quadrangle formed from the four approximation straight lines are determined. Then, diagonal lines of the four vertexes are drawn, and intersections of the diagonal lines and the outline of the bottom surface 15 are defined as the corners a, b, c, and d. By the above method, the four corners are determined even if the bottom surface 15 does not have a quadrangular shape, and the distances from the corners to the convex portions 35*a*, 35*b*, 35*c*, and 35*d* are obtained. Similarly, for the short sides e and f, when the bottom surface 15 has a substantially quadrangular shape, line segments connecting the corners obtained as described above can be regarded as the short sides. The short side e is regarded as a line segment connecting the corner a and the corner b, and the short side f is regarded as a line segment connecting the corner c and the corner d.

Figure 7:
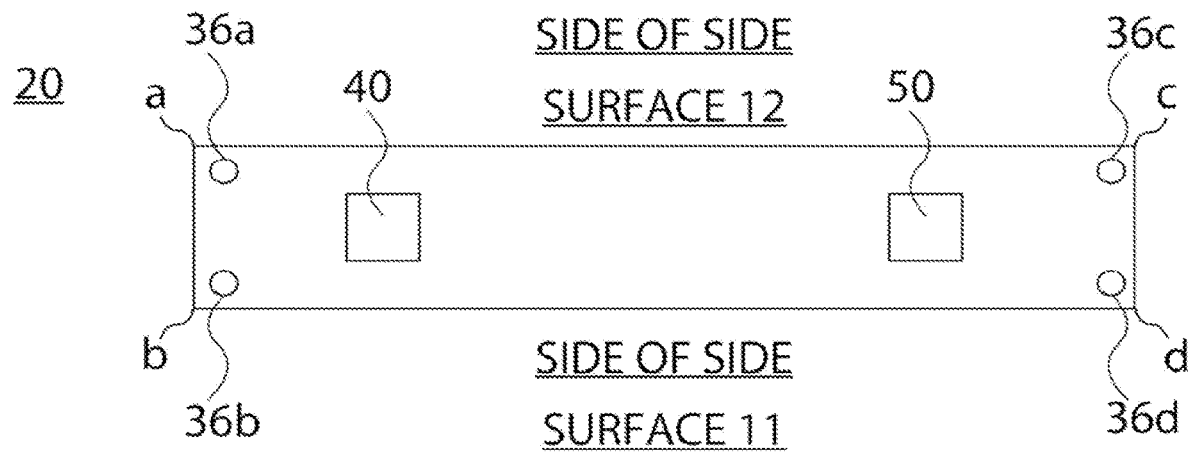
FIG. 7 is a conceptual diagram of a lid according to an embodiment.

Next, the convex portions of the lid 20 will be described. A conceptual diagram of FIG. 7 shows a surface having the positive electrode terminal and the negative electrode terminal of the outer surface of the lid 20 where hemispherical or conical convex portions 36 exist. On the surface having the positive electrode terminal and the negative electrode terminal of the outer surface of the lid 20, the convex portions 36 exist. The conceptual diagram of FIG. 7 shows the four corners a, b, c, and d of the lid 20. For example, distances between the convex portions 36 of the lid 16 and the positive electrode terminal 40 or the negative electrode terminal 50 of the lid 16 can be evaluated. In the conceptual diagram of FIG. 7, the convex portions 36*a*, 36*b*, 36*c*, and 36*d* exist one by one in the vicinity of all the four corners a, b, c, and d. If the two convex portions 36 exist on the lid 20, the outer shape of the lid 16 can be evaluated from a distance of the two convex portions 36. If there are the three convex portions 36, three distances between the convex portions 36 are obtained. Therefore, this is preferable in that the outer shape evaluation of the lid 20 can be performed in more detail than that in the case of using only the distance from the two convex portions. If there are the four convex portions 36, six distances between the convex portions are obtained. Therefore, this is preferable in that the outer shape evaluation of the lid 20 can be performed in more detail than that in the case of using the distances from the three convex portions.

In performing the outer shape evaluation, the larger distance between the convex portions is preferable because more detailed outer shape evaluation can be performed. The convex portion 36 preferably exists in the vicinity of at least one of the four corners a, b, c, and d. Specifically, the convex portion 36 exists preferably within a range of 10 mm or less from the corner (the distance between the corner and the convex portion). The convex portion 36 exists more preferably within a range of 0.5 mm or more and 5 mm or less, still more preferably, within a range of 0.5 mm or more and 3 mm or less from the corner. The distances between the corners a, b, c, and d and the convex portions 36 are distances from the corners to the vertexes of the nearest convex portions 36 in the vicinity of the corners.

In order to evaluate the outer shape, the convex portions 36 preferably exist in the vicinity of all the four corners a, b, c, and d. Therefore, as shown in the conceptual diagram of FIG. 7, it is preferable that the convex portions 36 exist within a range of 10 mm or less from the four corners a, b, c, and d of the lid 20, and one convex portion exists at each of the corners a, b, c, and d. Further, it is more preferable that the convex portions 36 exist within a range of 0.5 mm or more and 10 mm or less from the four corners a, b, c, and d of the lid 20, and one convex portion exists at each of the corners a, b, c, and d. It is preferable that the convex portions 36 exist within a range of 0.5 mm or more and 3 mm or less from the four corners a, b, c, and d of the lid 20, and one convex portion exists at each of the corners a, b, c, and d. Further, a difference between a maximum value and a minimum value of the distances between the convex portions 36 and the corners is preferably within 20% of an average value of the distances between the convex portions 36 and the corners, because there is little variation in the positions of the convex portions 36.

Figure 8:
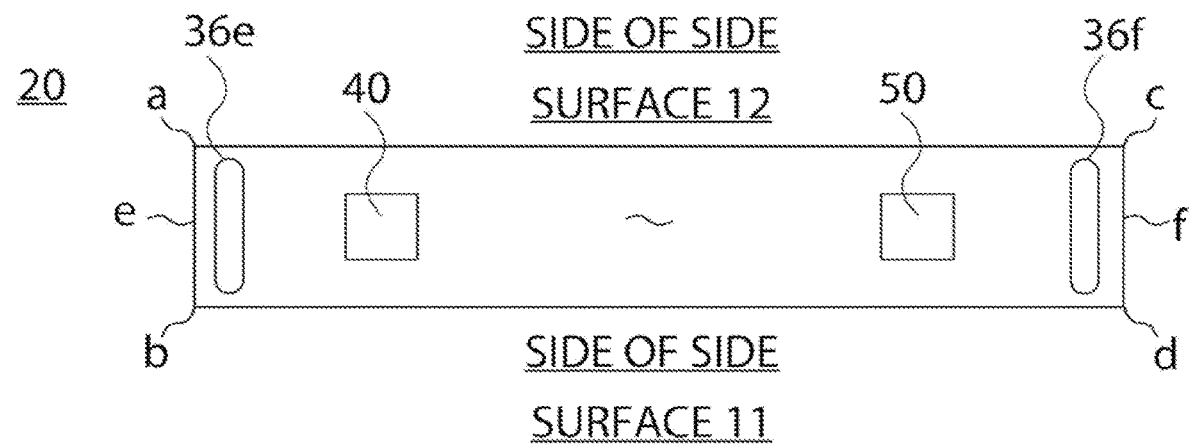
FIG. 8 is a conceptual diagram of a lid according to an embodiment.

Further, as shown in a conceptual diagram of FIG. 8, a mode in which linear convex portions 36e and 36f exist on the lid 20 of the outer surface of the outer can 10 is also preferable. For example, distances between the convex portions 36e and 36f of the lid 16 and the positive electrode terminal 40 or the negative electrode terminal 50 of the lid 16 can be evaluated. Since there are the two linear convex portions 36e and 36f, the outer shape of the secondary battery can be evaluated from a distance between the linear convex portions 36e and 36f. An aspect ratio (length/width) of the linear convex portions 36e and 36f is preferably 3 or more and 10 or less. In the linear convex portions 36e and 36f, each distance from the two short sides e and f of the lid 20 is preferably 10 mm or less. In the linear convex portions 36e and 36f, each distance from the two short sides e and f of the lid 20 is more preferably 0.5 mm or more and 5 mm or less, still more preferably, 0.5 mm or more and 3 mm or less When the bottom surface 15 does not have a quadrangular shape but has a substantially quadrangular shape such as a rounded quadrangular shape, the corners a, b, c, and d of the side surfaces 13 and 14 are determined by the following method. Approximation straight lines of the four sides of the side surfaces 13 and 14 are obtained, and then four vertexes of a quadrangle formed from the four approximation straight lines are determined. Then, diagonal lines of the four vertexes are drawn, and intersections of the diagonal lines and the outlines of the side surfaces 13 and 14 are defined as the corners a, b, c, and d. By the above method, the four corners are determined even if the side surfaces 13 and 14 do not have a quadrangular shape, and distances from the corners to the convex portions 36a, 36b, 36c, and 36d are obtained. Similarly, for the short sides e and f, when the bottom surface 15 has a substantially quadrangular shape, line segments connecting the corners obtained as described above can be regarded as the short sides. The short side e is regarded as a line segment connecting the corner a and the corner b, and the short side f is regarded as a line segment connecting the corner c and the corner d.

The heights of the convex portions 31, 32, 33, 34, 35, and 36 are preferably 0.05 mm or more and 0.5 mm or less. If the heights of the convex portions 31, 32, 33, 34, 35, and 36 are too low, this is not preferable because it is difficult to distinguish them from slight irregularities of the outer can 10 or the lid 20. Further, if the heights of the convex portions 31, 32, 33, 34, 35, and 36 are too high, this is not preferable when the secondary battery 100 is accommodated at a high density, because the secondary battery 100 becomes bulky due to the convex portions. The height H1 (mm) of the convex portions 31, 32, 33, 34, and 35 is obtained by H1=L1−D1, using the distance L1 (mm) between the vertexes of the convex portions 31, 32, 33, 34, and 35 and the inner surface of the outer can 10 and the thickness D1 (mm) of the surface of the outer can 10 having the convex portions. The height H2 (mm) of the convex portion 36 is obtained by H2=L2−D2, using the distance L2 (mm) between the vertex of the convex portion 36 and the inner surface of the lid and the thickness D2 (mm) of the surface of the lid having the convex portions.

By providing a plurality of convex portions functioning as the basis for external dimensions in a place of the metal outer can 10 where deformation of the can bottom or the can side surface is unlikely to occur, a square battery with high external precision can be provided.

The outer shape evaluation of the secondary battery 100 is performed by, for example, performing a three-dimensional scan with laser light or pattern light to specify the positions of the convex portions. In addition, the outer shape evaluation of the secondary battery 100 can be performed by placing the secondary battery 100 on a surface plate so that convex portion surfaces are in contact with the surface plate so as to be stable, and measuring the positions and the heights of the convex portions of the lid 16 or the positions and the heights of the positive electrode terminal 40 and the negative electrode terminal using a height gauge. Further, it is also possible to measure the distances between the convex portions by sandwiching the convex portions with a caliper or a micrometer. In addition, the height of the secondary battery 100 can be evaluated by sandwiching the convex portions 35 of the bottom surface 15 and the positive electrode terminal 40 and the negative electrode terminal 50 with the caliper or the micrometer.

Further, information obtained by evaluating the outer shape on the basis of the convex portions after manufacturing the secondary battery 100 can be stored in a two-dimensional code or the like, and the two-dimensional code or the like can be printed or pasted on the secondary battery. By recording an outer shape evaluation result at the time of manufacturing in the secondary battery, a change amount and a change position of the outer shape can be automatically and quickly obtained when the outer shape evaluation is performed during or after use of the secondary battery.

Second Embodiment

A second embodiment relates to a battery module. In the second embodiment, a secondary battery according to the first embodiment is configured as a cell, and one or more cells are used. Since the secondary battery according to the first embodiment is easy to evaluate an outer shape, in a battery module using the secondary battery, it is possible to accurately evaluate a shape error in the module design, so that the cells can be more efficiently accommodated. When a plurality of cells are included in the battery module, the cells are disposed to be electrically connected in series, in parallel, or in series and in parallel.

Figure 9:
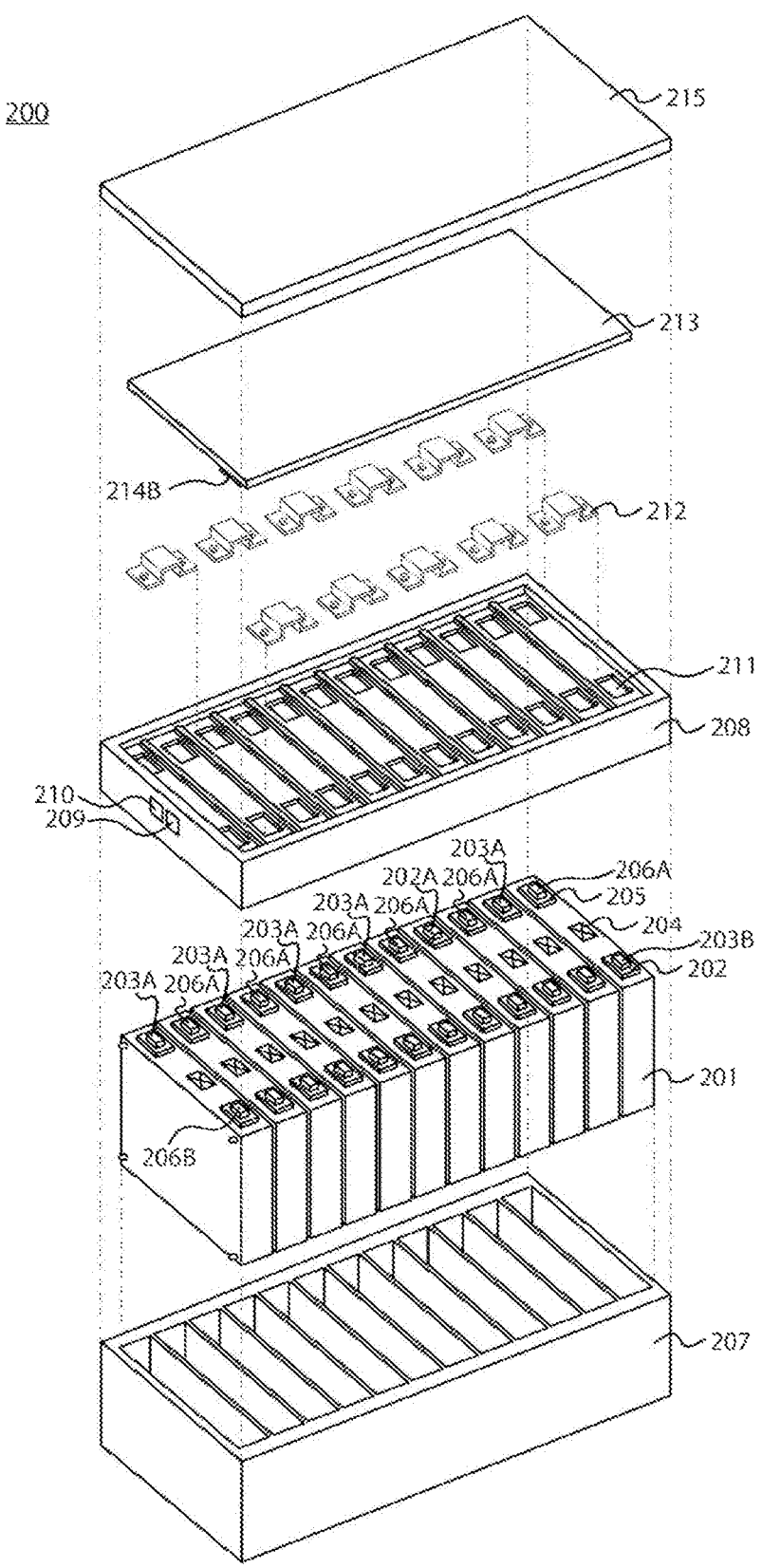
FIG. 9 is a perspective developed view of a battery module according to an embodiment.
Figure 10:
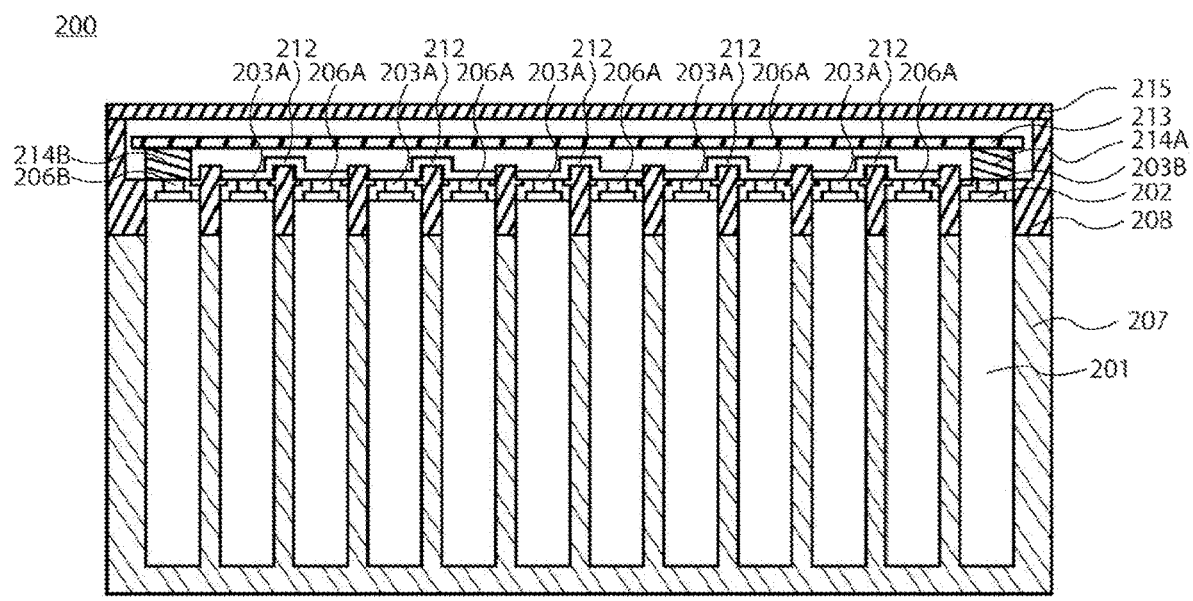
FIG. 10 is a cross-sectional view of a battery module according to an embodiment.

A battery module 200 will be specifically described with reference to a perspective developed view of FIG. 9 and a cross-sectional view of FIG. 10. In the battery module 200 shown in FIG. 9, a secondary battery 100 according to the first embodiment having convex portions on an outer surface is used as a cell 201. The cross-sectional view of FIG. 10 shows a cross-section including a positive electrode terminal 203B and a negative electrode terminal 206B of the perspective developed view of FIG. 9.

Each of the plurality of cells 201 has, outside an outer can thereof, a positive electrode terminal 203 (203A and 203B) provided in a positive electrode gasket 202, a safety valve 204, and a negative electrode terminal 206 (206A and 206B) provided in a negative electrode gasket 205. The cells 201 shown in FIG. 9 are disposed so as to be staggered. Although the cells 201 shown in FIG. 9 are connected in series, the cells 201 may be connected in parallel by changing a disposition method or the like.

The cell 201 is accommodated in a lower case 207 and an upper case 208. The upper case 208 is provided with power input/output terminals 209 and 210 (a positive electrode terminal 209 and a negative electrode terminal 210) of the battery module. Openings 211 are provided in the upper case 208 in alignment with the positions of the positive electrode terminal 203 and the negative electrode terminal 206 of the cell 201, and the positive electrode terminal 203 and the negative electrode terminal 206 are exposed from the openings 211. The exposed positive electrode terminal 203A is connected to the negative electrode terminal 206A of the adjacent cell 201 by a bus bar 212, and the exposed negative electrode terminal 206A is connected to the positive electrode terminal 203A of another adjacent cell 201 opposite to the adjacent cell 201 by the bus bar 212. The positive electrode terminal 203B not connected by the bus bar 212 is connected to a positive electrode terminal 214A provided in a substrate 213, and the positive electrode terminal 214A is connected to the power input/output terminal 209 of the positive electrode via a circuit on the substrate 213. Further, the negative electrode terminal 206B not connected by the bus bar 212 is connected to a negative electrode terminal 214B provided in the substrate 213, and the negative electrode terminal 214B is connected to the power input/output terminal 210 of the negative electrode via a circuit on the substrate 213. The power input/output terminals 209 and 210 are connected to a charging power supply or a load (not shown) to enable charging and using the battery module 200. The upper case 208 is sealed with a lid 215. The substrate 213 is preferably provided with a charging/discharging protection circuit. Further, addition of a configuration such as a configuration in which information such as deterioration of the cell 201 can be output from a terminal (not shown) may be appropriately performed.

Third Embodiment

Figure 11:
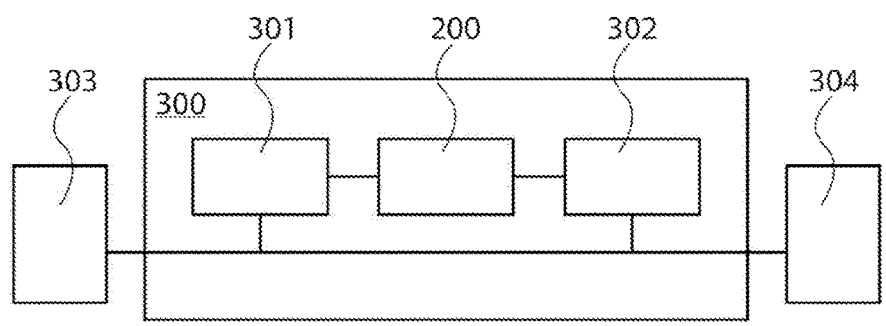
FIG. 11 is a conceptual diagram of a storage device according to an embodiment.

A third embodiment relates to a storage device. A battery module 200 according to the second embodiment can be mounted on a storage device 300. The storage device 300 shown in a conceptual diagram of FIG. 11 includes the battery module 200, an inverter 302, and a converter 301. AC power from an external AC power supply 303 is DC-converted by the converter 301, the battery module 200 is charged, DC power from the battery module 200 is AC-converted by the inverter 302, and electricity is supplied to a load 304 connected to the storage device 300. By the storage device 300 of the present configuration including the battery module 200 according to the second embodiment, a storage device having excellent battery characteristics is provided.

Fourth Embodiment

Figure 12:
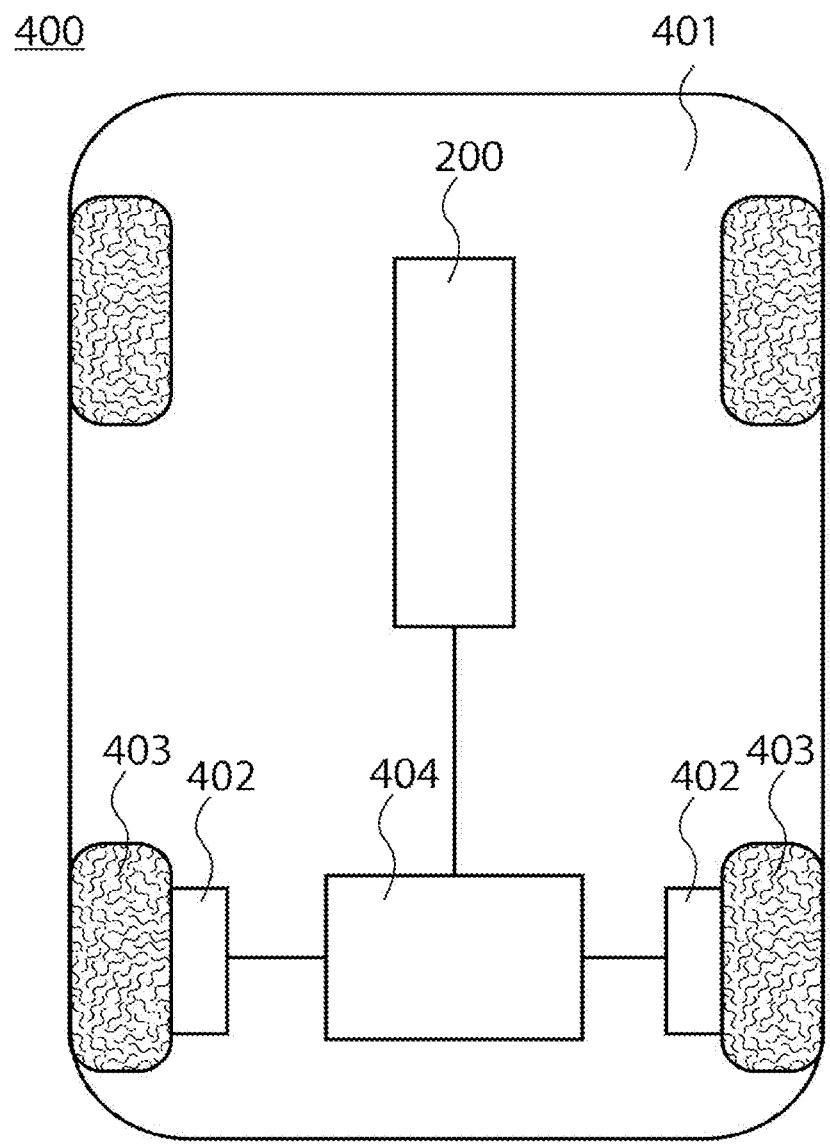
FIG. 12 is a conceptual diagram of a vehicle according to an embodiment.

A fourth embodiment relates to a vehicle. The vehicle according to the fourth embodiment uses a battery module 200 according to the second embodiment. A configuration of the vehicle according to the present embodiment will be simply described using a conceptual diagram of a vehicle 400 in FIG. 12. The vehicle 400 has the battery module 200, a vehicle body 401, motors 402, wheels 403, and a control unit 404. The battery module 200, the motors 402, the wheels 403, and the control unit 404 are disposed on the vehicle body 401. The control unit 404 converts power output from the battery module 200 and adjusts the output. The motor 402 rotates the wheels 403 using the power output from the battery module 200. The vehicle 400 also includes an electric vehicle such as an electric train and a hybrid vehicle having another driving source such as an engine. The battery module 200 may be charged by regenerative energy from the motor 402. A target driven by electric energy from the battery module 200 is not limited to the motor, and the electric energy may be used as a power source for operating electric devices included in the vehicle 400. Further, it is preferable that the regenerative energy is obtained when the vehicle 400 is decelerated, and the battery module 200 is charged using the obtained regenerative energy. By the vehicle 400 of the present configuration having the battery module 200 according to the second embodiment, a vehicle having excellent battery characteristics is provided.

Fifth Embodiment

Figure 13:
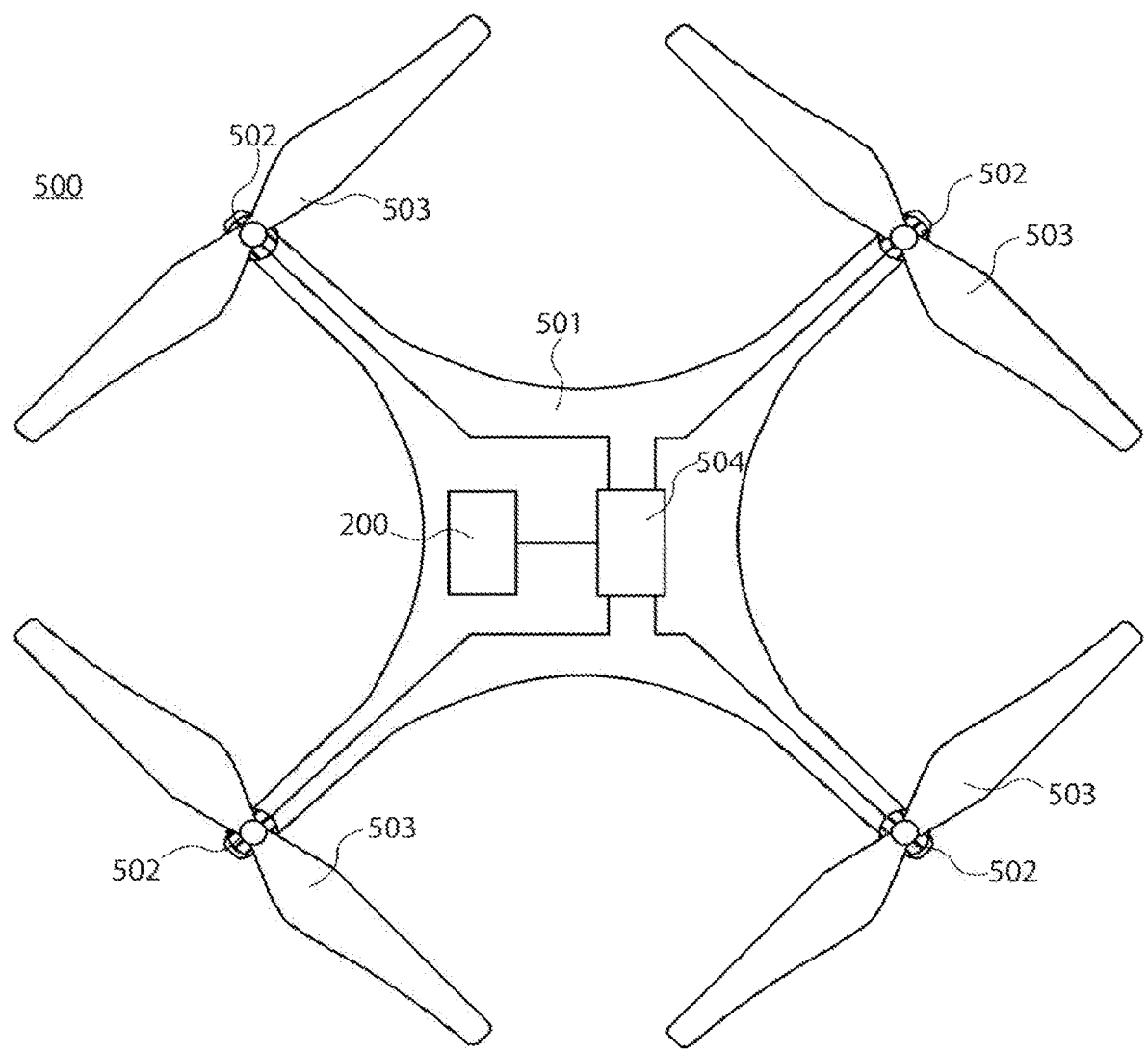
FIG. 13 is a conceptual diagram of a flying object according to an embodiment.

A fifth embodiment relates to a flying object (for example, a multicopter). The flying object according to the fifth embodiment uses a battery module 200 according to the second embodiment. A configuration of the flying object according to the present embodiment will be simply described using a conceptual diagram of a flying object (quadcopter) 500 in FIG. 13. The flying object 500 has the battery module 200, an airframe 501, motors 502, rotary wings 503, and a control unit 504. The battery module 200, the motors 502, the rotary wings 503, and the control unit 504 are disposed on the airframe 501. The control unit 504 converts power output from the battery module 200 and adjusts the output. The motor 502 rotates the rotary wings 503 using the power output from the battery module 200. By the flying object 500 of the present configuration having the battery module 200 according to the second embodiment, a flying object having excellent battery characteristics is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rectangular secondary battery, comprising:
   an outer can formed in a shape of a bottomed cylinder having a cross-sectional shape of a substantially quadrangular shape, the outer can having an opening;
   a power generation element contained in the outer can; and
   a lid having a positive electrode terminal and a negative electrode terminal, the lid covering the opening of the outer can, wherein four convex portions exist on each of one or more sides of a side surface of an outer surface of the outer can, a bottom surface of the outer surface of the outer can, and a surface having the positive electrode terminal, and the negative electrode terminal being the outer surface of the lid, each of the convex portions on the side surface of the outer can exist within a range of 10 mm or less from each of corners of respective of the side surface of the outer surface of the outer can, each of the convex portions on the bottom surface of the outer can exist within a range of 10 mm or less from each of corners of respective of the bottom surface of the outer surface of the outer can, and each of the convex portions on the lid of the outer can exist within a range of 10 mm or less from each of corners of respective of the surface having the positive electrode terminal and the negative electrode terminal of the outer surface of the lid.

2. The rectangular secondary battery according to claim 1, wherein heights of the convex portions are 0.05 mm or more and 0.5 mm or less.

3. The rectangular secondary battery according claim 1, wherein the convex portions have a hemispherical or conical shape.

4. The rectangular secondary battery according to claim 1, wherein the convex portions on the bottom surface of the outer can and the convex portions on the lid of the outer can have a linear shape, the linear convex portions exist within a range of 10 mm or less from respective of two short sides of the bottom surface of the outer surface of the outer can, one linear convex portion existing at each of the short sides, and the linear convex portions exist within a range of 10 mm or less from respective of two short sides of the surface having the positive electrode terminal and the negative electrode terminal of the outer surface of the lid, one linear convex portion existing at each of the short sides.

5. The rectangular secondary battery according to claim 1, wherein a length of a short side of the bottom surface of the outer surface of the outer can is 5 mm or more and 45 mm or less, a length of a long side of the bottom surface of the outer surface of the outer can is 60 mm or more and 180 mm or less, a length of a short side of the surface having the positive electrode terminal and the negative electrode terminal of the outer surface of the lid is 5 mm or more and 45 mm or less, and a length of a long side of the surface having the positive electrode terminal and the negative electrode terminal of the outer surface of the lid is 60 mm or more and 180 mm or less.

6. A battery module comprising the rectangular secondary battery according to claim 1.

7. A storage device comprising the battery module according to claim 6.

8. A vehicle comprising the battery module according to claim 6.

9. A flying object comprising the battery module according to claim 6.

* * * * *